United States Patent
Hu et al.

(10) Patent No.: US 9,826,130 B2
(45) Date of Patent: Nov. 21, 2017

(54) INFRARED CAMERA

(71) Applicant: BOLY MEDIA COMMUNICATIONS (SHENZHEN) CO., LTD., Shenzhen (CN)

(72) Inventors: Xiaoping Hu, Shenzhen (CN); Xia Shen, Shenzhen (CN)

(73) Assignee: Boly Media Communications (Shenzhen) Co., Ltd, Guangdong (CN)

( * ) Notice: Subject to any disclaimer, the term of this patent is extended or adjusted under 35 U.S.C. 154(b) by 250 days.

(21) Appl. No.: 14/766,706

(22) PCT Filed: Jun. 17, 2013

(86) PCT No.: PCT/CN2013/077304
§ 371 (c)(1),
(2) Date: Aug. 7, 2015

(87) PCT Pub. No.: WO2014/121575
PCT Pub. Date: Aug. 14, 2014

(65) Prior Publication Data
US 2015/0381865 A1    Dec. 31, 2015

(30) Foreign Application Priority Data
Feb. 8, 2013 (CN) .......................... 2013 1 0050204

(51) Int. Cl.
*H04N 5/225*    (2006.01)
*H04N 5/33*    (2006.01)
(Continued)

(52) U.S. Cl.
CPC ........... *H04N 5/2256* (2013.01); *G03B 15/05* (2013.01); *H04N 5/2252* (2013.01);
(Continued)

(58) Field of Classification Search
CPC .................................................. H04N 5/2256
See application file for complete search history.

(56) References Cited

U.S. PATENT DOCUMENTS

| 5,287,129 A | 2/1994 | Sano et al. |
| 5,359,779 A | 11/1994 | Polk |

(Continued)

FOREIGN PATENT DOCUMENTS

| CN | 2206984 | 9/1995 |
| CN | 201146561 | 11/2008 |
| CN | 201251678 | 6/2009 |

OTHER PUBLICATIONS

International Preliminary Report on Patentability Chapter I for International Application No. PCT/CN2013/077304, dated Aug. 11, 2015.

(Continued)

*Primary Examiner* — Mehrdad Dastouri
*Assistant Examiner* — Rowina Cattungal
(74) *Attorney, Agent, or Firm* — Ladas & Parry, LLP (57) ABSTRACT

An infrared camera, comprising photosensitive element (101) capable of sensing infrared spectrum, gas discharge flash acting as flash light source (102), a first optical filter (103) filtering visible lights and allowing infrared light to transmit, and processing module (105) used to execute instructions, wherein the first optical filter is fixedly or removablely disposed in the emitted light path of the flash light source. Due to gas discharge flash filtering visible lights and acting as infrared light source, the camera could provide infrared lighting capability far better than infrared LED, improving the nighttime infrared photographing quality.

8 Claims, 6 Drawing Sheets

(51) Int. Cl.
*G03B 15/05* (2006.01)
*H04N 5/232* (2006.01)
(52) U.S. Cl.
CPC ....... *H04N 5/2254* (2013.01); *H04N 5/23245* (2013.01); *H04N 5/33* (2013.01); *H04N 5/332* (2013.01)

(56) References Cited

U.S. PATENT DOCUMENTS

| | | | | |
|---|---|---|---|---|
| 5,594,512 | A * | 1/1997 | Yoneda | A61B 3/145 351/206 |
| 2007/0285766 | A1* | 12/2007 | Sun | G02B 5/208 359/361 |
| 2008/0252730 | A1* | 10/2008 | Hong | G08B 13/19 348/155 |
| 2011/0043661 | A1* | 2/2011 | Podoleanu | A61B 3/102 348/239 |

OTHER PUBLICATIONS

Written Opinion of the International Searching Authority for International Application No. PCT/CN2013/077304, dated Nov. 7, 2013.
Supplementary European Search Report for EP application No. 13874850.4, dated Aug. 9, 2016.
From AU2013377565, Notice of Acceptance dated Feb. 20, 2016.
International Search Report dated Nov. 7, 2013 for International Application No. PCT/CN2013/077304.

\* cited by examiner

INFRARED CAMERA

CROSS-REFERENCE TO RELATED APPLICATION(S)

This application is the U.S. National Stage of International Patent Application No. PCT/CN2013/077304 filed Jun. 17, 2013, which claims priority to Chinese Patent Application No. 201310050204.1 filed Feb. 8, 2013, the disclosures of which are incorporated in their entireties herein by reference.

FIELD OF THE INVENTION

This invention relates to camera technology field, in particular to an infrared camera.

BACKGROUND OF THE INVENTION

Cameras taking pictures at night are widely used, e.g. in outdoor surveillance and hunting monitoring. According to the different nighttime illumination modes, the cameras taking pictures at night could be categorized in two types:

One type uses Xenon flash, also called HID Intensity discharge lamp, as flash to take color photos. While the Xenon flash is used for illumination, High voltage current of thousands of volts stimulates Xenon to illuminate, generating white arcs similar to fluorescent lamp between the two poles, which has good night illumination for clear color photographs. But because there is a strong visible light flashes when photo is taken, animals may be frightened or the attention may be attracted in monitoring, the use has no concealment.

The other type uses infrared LED as illumination source of photos or videos to take black and white images. The infrared LED emits light not through the electronic transitions within the atom, but through adding voltage on the two ends of PN junction, making the PN junction itself to form energy level on which the electrons transit. Based on the light emitting principle of LED, the instant illumination intensity in photo-taking is generally low, far from the high intensity illumination generated by instant high voltage of gas discharge flash, so the images has more noise and it is easy to cause motion blur. But infrared lights emitted by the infrared LED has good concealment, therefore current outdoor surveillance camera and hunting monitoring camera mainly use infrared LED as illumination source.

SUMMARY OF THE INVENTION

According to one embodiment of the present invention, infrared camera includes: photosensitive element, the spectrum sensing range including at least the infrared spectroscopy; flash light source, using gas discharge flash; a first optical filter, fixedly or removablely disposed in the emitted light path of the flash light source, the optical filter is to filter visible light and allow infrared light to transmit; processing module, used to execute instructions, the instructions execution includes: execute workflow, wherein photographing process is included, the photographing process includes controlling flash light source to flash and acquire photo data collected by the photosensitive element.

The infrared camera according to an embodiment of the present invention breakthrough the conventional use of gas discharge flash, using gas discharge flash with visible light filtered creatively, providing infrared illumination capability far from infrared LED based on different emitting light principle, thus improving the quality of infrared photographing at night effectively.

Hereafter the specific embodiments of the present invention are described in detail with the drawings.

DETAILED DESCRIPTION OF THE INVENTION

Embodiment 1

Figure 1:
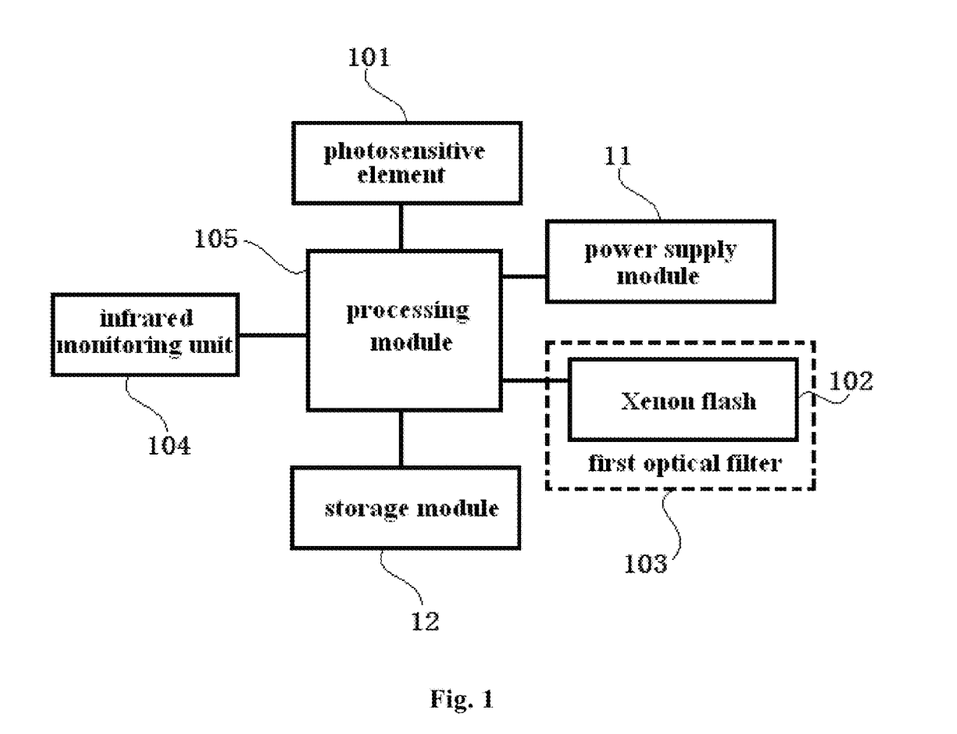
FIG. 1 is structure diagram of an infrared camera according to one embodiment of the present invention.

Refer to FIG. 1, an infrared camera according to an embodiment of the present invention includes photosensitive element 101, Xenon flash 102 used as flash light source, a first optical filter 103, infrared monitoring unit 104, and processing module 105. Additionally, according to the general configuration of conventional camera, the infrared camera also includes power supply module 11 providing power supply to various components and storage module 12 for photographing data storage, the above two conventional modules could be manufactured and sold independently as removable accessories.

The spectrum sensing range of photosensitive element includes visible lights and infrared light. It should be noted that the spectrum sensing range in present invention, such as visible lights and infrared light, should be understood as the range substantially compliant with the typical range of knowledge, not certain strict range of values. For example, it is normally considered that the light with wavelength of 800 nm-1000 nm belongs to near infrared light, so the camera with the light sensing range covering 800 nm-1000 nm can sense the infrared light; For another example, it is normally considered that the light with wavelength of 400 nm-800 nm belongs to visible lights, the camera capable of filtering (e.g. more than 50%) spectrum of 400 nm-800 nm can be considered to be visible lights filtering capable.

Figure 2:
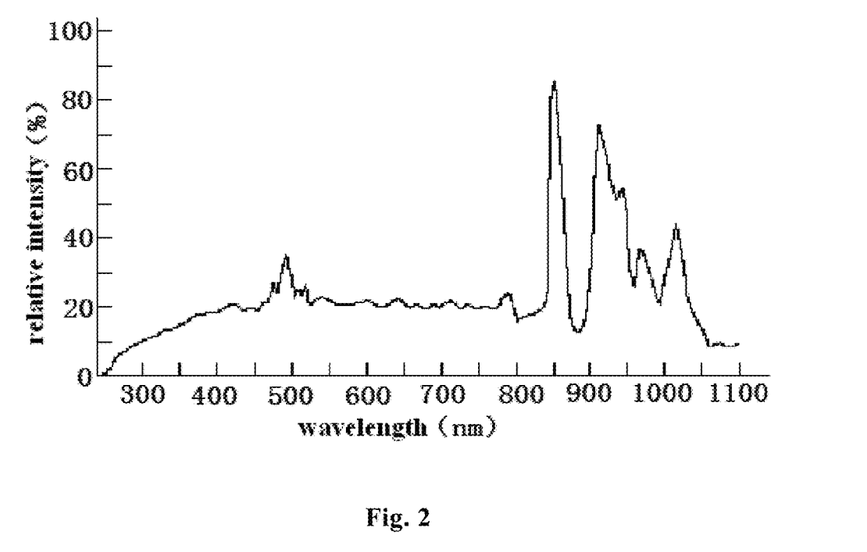
FIG. 2 is the spectrum diagram of the Xenon flash.

Xenon flash 102 is generally gas light used to provide sunlight similar illumination, a common design approach is: high pressure Xenon is filled in the quartz tube, the two electrodes use mercury and carbon compound, high voltage such as 4000V is used to stimulate the Xenon to ionize and conduct through stabilizer (ballast), enabling the power stored in the capacitor to discharge through flash tube, which is converted to luminous energy, thus a flash is accomplished. The spectrum range of Xenon flash is substantially illustrated in FIG. 2, between 300 nm and 1100 nm. It can be seen from FIG. 2 that Xenon flash has very good radiation intensity in near infrared spectrum range (800 nm-1000 nm), therefore, Xenon flash could provide good infrared illumination with the visible lights filtered, which improves the image noise and motion blur encountered by conventional infrared LED and acquires clear nighttime infrared (black and white) image.

The first optical filter 103 is removablely disposed on the emitted light path of Xenon flash 102, the first optical filter 103 could filter visible lights and allows infrared light to transmit, for example, the first optical filter could be simple black glass.

The infrared monitoring unit 104 is a device capable of detecting the infrared radiation (e.g. infrared radiation from human being or animal) in the monitoring area, for example, passive infrared (PIR), which can produce monitoring trigger signal. It is easy to understand that the monitoring trigger signal could be digital signal or analog signal based on different sensor configuration, and could be directly sent to the appropriate interface of the processing module 105, or sent to the appropriate interface of the processing module 105 after common software/hardware processing, such as analog/digital conversion, amplification, rectification, filtration.

The processing module 105 is used to execute instructions to control various connected components, acting as logic processing device to implement control functionality. In particular the processing module 105 could be SCM, control chip, CPU, etc. The instructions executed by the processing module 105 could be stored in itself cache or the memory (not shown) outside the processing module, the execution of the instructions includes: executing flash working mode setting flow, executing monitoring flow, executing workflow etc., wherein:

Flash working mode setting flow includes acquiring input flash setting signal (for example, setting commands input by the user via man-machine interface) and determining whether or not to set the mode to infrared mode based on the input flash setting signal;

The monitoring flow includes acquiring the monitoring trigger signal generated by the infrared monitoring unit 104 and start workflow based on the monitoring trigger signal;

The workflow includes photographing flow, which could include controlling Xenon flash 102 to flash and acquiring and processing the photo data collected by the photosensitive element 101, in case that the flash working mode is set to infrared mode, the predefined black and white processing mode is used to process the photo data, in case that the flash working mode is not set to infrared mode, the predefined color processing mode is used to process the photo data. The processed photo data could be stored in storage 12.

Figure 3:
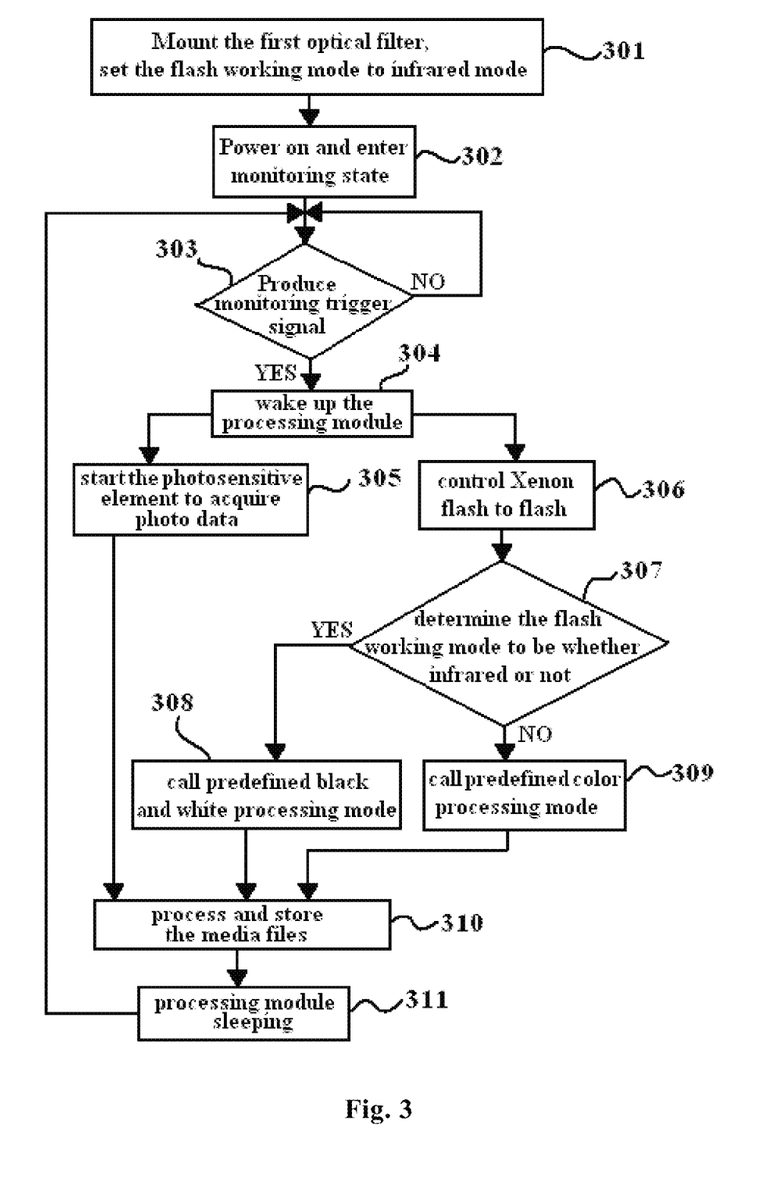
FIG. 3 is work flow chart of the infrared camera in embodiment 1.

Refer to FIG. 3, the working flow of the infrared camera of present embodiment includes:

Step 301. The user mounts a first optical filter and set the flash working mode to infrared mode through the camera operation interface. The user could choose whether or not to mount the first optical filter according to requirements, if concealed nighttime infrared photos are expected, the first optical filter is to be mounted and the corresponding flash working mode is to be set, if color photos are expected, the first optical filter is not to be mounted.

Step 302. the user powers on the camera, the infrared monitoring unit starts working, the camera enters monitoring state, in the monitoring state, the infrared monitoring unit could keep on monitoring whether or not there are animals or people entering the monitored area.

Step 303. Once the infrared monitoring unit inspects infrared radiation, the monitoring trigger signal is produced, otherwise, the infrared monitoring unit keeps on monitoring.

Step 304. The processing module is woken up by the monitoring trigger signal and workflow is started, go to step 305 and 306.

Step 305. Starting photosensitive element and collecting photo data.

Step 306. Controlling Xenon flash to flash.

Step 307. Determine whether the flash working mode is infrared mode or not, if yes go to step 308, if no go to step 309.

Step 308. Calling the predefined black and white processing mode.

Step 309. Calling the predefined color processing mode.

Step 310. Processing and storing the media files.

Step 311. The processing module enters hibernation to save energy consumption, waiting for being woken up by next monitoring trigger signal from the infrared monitoring unit.

In present embodiment, the photosensitive element not only senses visible lights but also infrared light, in other embodiments, the spectrum sensing range of the photosensitive element can also include infrared spectrum, thus resulting in becoming infrared camera dedicated for infrared image photographing.

In present embodiment, the first optical filter is disposed in the emitted light path of the flash light source, resulting in not only high intensity infrared illumination, but also avoiding disturbing the photographed objects with high intensity visible lights and improving photographing concealment. Additionally, in present embodiment, the first optical filter uses removable configuration to facilitate Xenon flash to act as not only infrared light source but also white light source. In other embodiments, the first optical filter could also be fixedly disposed in the emitted light path of the flash light source, in this case, the flash light source is dedicated for high intensity infrared illumination, accordingly, the camera is designed to be dedicated for infrared image photographing, or could be provided with visible lights illumination source. If the camera is dedicated for infrared image photographing, the processing module does not need to execute flash working mode setting flow, accordingly, the corresponding processing mode does not need to be selected according to whether it is color or not when the photo data is processed.

In present embodiment, the infrared monitoring unit is set up to enable working control automatically according to the detected infrared radiation, applicable for the circumstance wherein automatic monitoring is needed. In other embodiments, the infrared monitoring unit may not be set up, the processing module executing the monitoring flow is of course unnecessary, for example, the operator can actively control to take photos.

Xenon flash is selected as the flash light source of present embodiment, in other embodiments, other gas discharge flashes could also be selected, such as Neon flash, Helium flash, Nitrogen flash and Argon flash etc. It has been hundreds of years history since gas discharge flash was born, because the application is always used for visible lights illumination, the research direction is along the direction of more sunshine similarity which may result in more vivid colors in photograph, but the radiation in infrared range has never been used independently for nighttime illumination. Base on the conventional development orientation whose goal is high color temperature, Neon flash, Helium flash and Nitrogen flash have been almost eliminated, that is because their color temperature is low, the radiation range is partially red, their lighting ability in visible lights range is inferior to Xenon flash. However, based on the innovative ideas of present invention, it is a breakthrough to use spectrum characteristics of the gas discharge flash which has high intensity radiation capability in infrared spectrum, thus the eliminated gas discharge flash in visible lights illumination becomes good infrared flash after visible lights filtered simply, providing infrared illumination whose intensity is far above the infrared LED. Therefore, compared with current infrared LED camera, nighttime image quality and photographing distance are improved a lot. Certainly, if it is considered that the camera works in two different modes which are black and white mode and color mode, Xenon flash is still the better choice, because it can provide sunshine similar illumination while the first optical filter is removed, which makes the camera work in black and white(infrared) mode as well as in color (visible lights) mode.

Furthermore, in order to get better infrared illumination, the used gas discharge flash could use the method of spectral shift in manufacture process, which makes the radiation range shift to infrared area, for example, the spectral shift method is as below: adjusting the voltage added to the two ends of the flash (through using stabilizer outputting corresponding voltage); changing the ratio of the internal material of the light tube (for example, for Xenon flash, adjusting the ratio of Xenon, mercury and carbon compound); adding magnesium arsenate or manganese powder etc. to the material. Decreasing the color temperature of the gas discharge flash with various spectral shift methods, enabling the emitted lights shifting to the infrared spectrum, if the emitted lights are all infrared light, the first optical filter could be cancelled.

Embodiment 2

Figure 4:
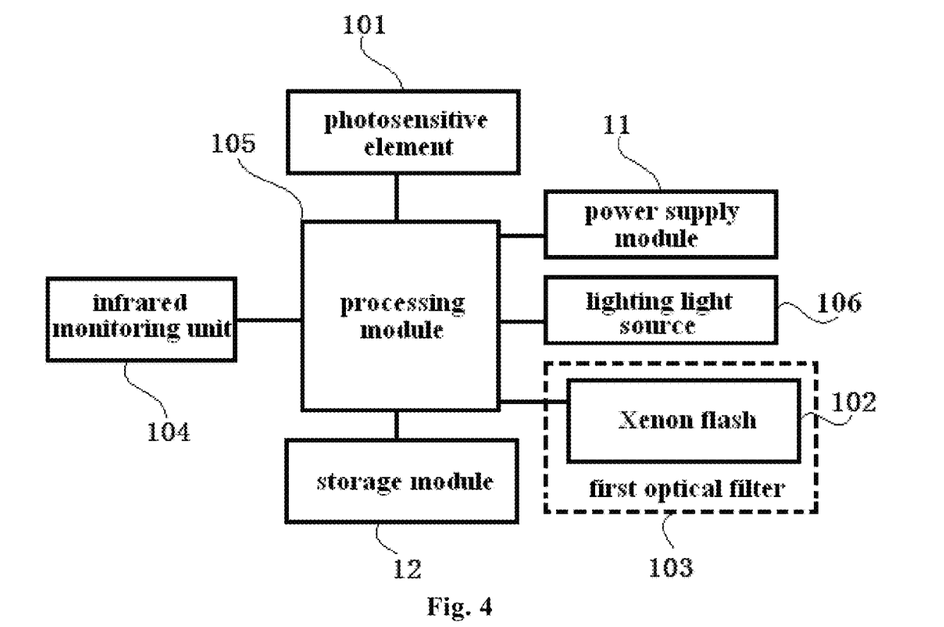
FIG. 4 is structure diagram of an infrared camera according to another embodiment of the present invention.

Refer to FIG. 4 (for simplicity, the components of the following embodiments whose functionalities are similar to embodiment 1 use the same numbering), an infrared camera according to another embodiment of present invention is provided with lighting light source 106 which is the difference comparing with embodiment 1.

Accordingly, the instructions executed by the processing module 105 further includes: camera working mode setting flow, which is to acquire input camera setting signal (for example, the setting command input by user via man-machine interface), based on which the camera working mode is set up photographing mode or video mode, once working flow is needed to start, photographing mode is started if the photographing mode is set, or video flow is started if the video mode is set;

The working flow executed by the processing module 105 further includes video flow, which includes controlling lighting light source 106 to open and acquiring video data collected by photosensitive element 101.

Present embodiment enable the infrared camera further having video capability as well as clear infrared nighttime photographing capability, for example, when infrared LED is selected as lighting light source, black and white video functionality is available, when white color LED is selected as lighting light source, color video functionality is available.

Embodiment 3

Figure 5:
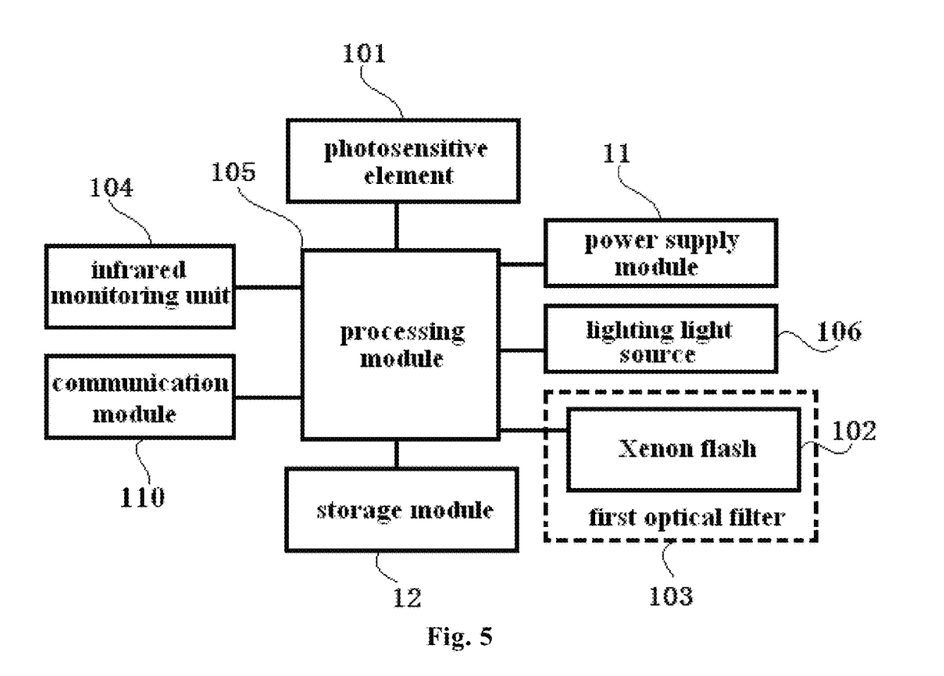
FIG. 5 is structure diagram of an infrared camera according to another embodiment of the present invention.

Refer to FIG. 5, an infrared camera according to another embodiment of present invention is provided with communication module 110 which is the difference comparing with embodiment 2.

Accordingly, the instructions executed by the processing module 105 further includes: data transmission flow, which is to sent the acquired data (for example, image or video) via the communication module 110 according to predefined transmission mode in the execution process of the working flow or after the working flow execution is accomplished, for example, the acquired data is sent to predetermined cell phone, computer or mailbox etc.

In present embodiment, communication module could be various wireless communication module, such as generation 2, generation 3, or generation 4 mobile communication module, could also be short-range wireless transmission module, such as Bluetooth, Wi-Fi, 2.4G module etc.

Embodiment 4

Figure 6:
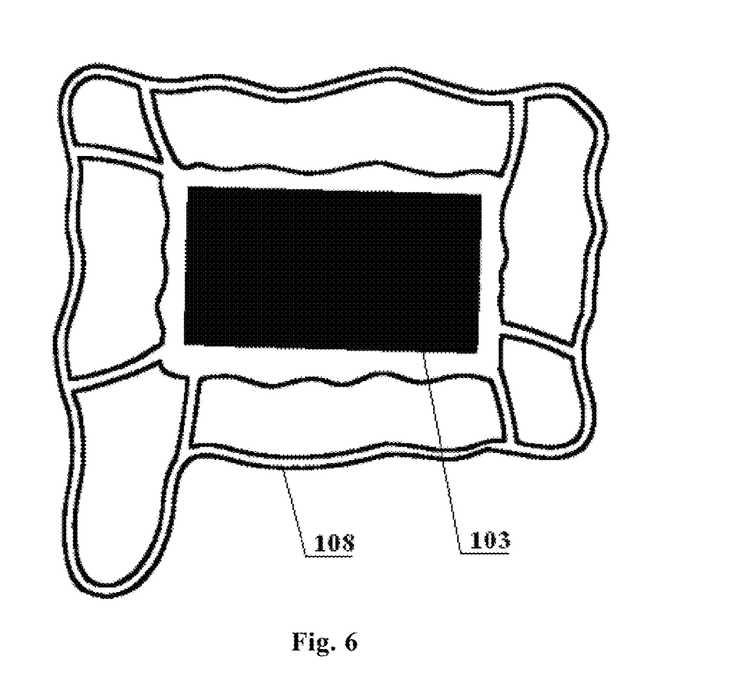
FIG. 6 is a structure diagram of the optical filter holder according to the present invention.
Figure 7:
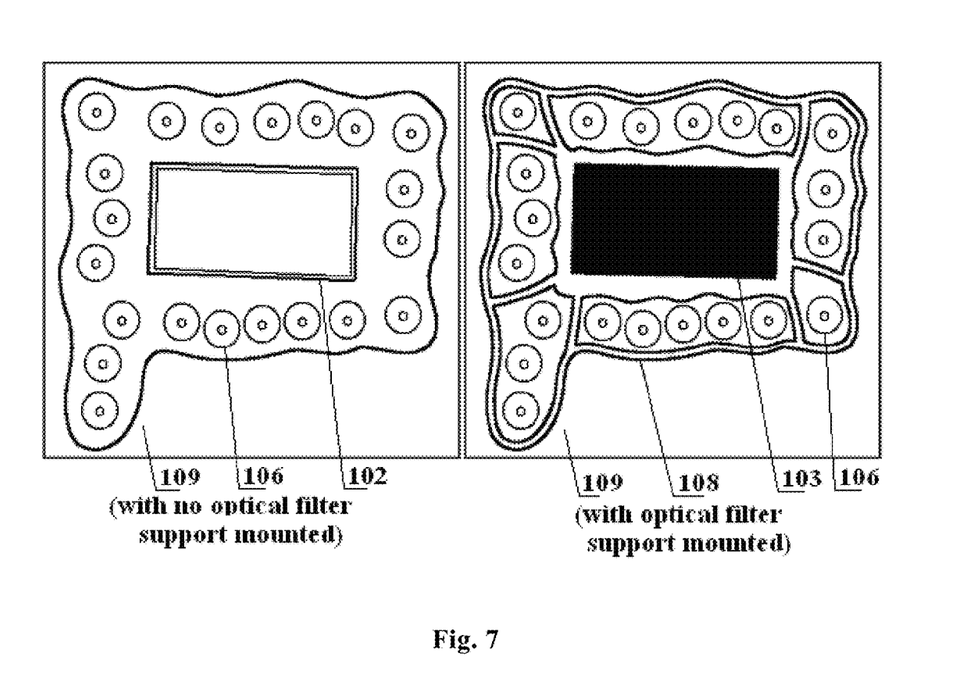
FIG. 7 is a diagram when the optical filter of FIG. 6 is fixed to the front cover of the camera.

The components structure of the infrared camera of present embodiment could take above-mentioned description for reference, present embodiment provides a structure to fix a first optical filter. Refer to FIG. 6 and FIG. 7, the structure used for fixation includes optical filter support 108, e.g. being formed as a holder, which has structures (for example, a plurality of buckles engaging with the front cover, not shown) matching front cover 109 of the camera, removablely engaging the front cover 109. The first optical filter 103 is embedded in the optical filter support 108, whose size and shape needs to adapt to the flash light source needed to be covered. (for example, matching the size of the lamp cup or matching the overall size of the flash). In case that the optical filter support 108 engages with the front cover 109, the first optical filter 103 cover the emitted light path of the flash light source 102.

In present embodiment, the first optical filter is fixed to the front cover of the camera with the optical filter support, when use is needed, engage the optical filter support, and clear black and white photos could be taken, when no use is needed, the optical filter support could be removed simply to take color photos, the support is easily to be manufactured and conveniently to be mounted.

Embodiment 5

Figure 8:
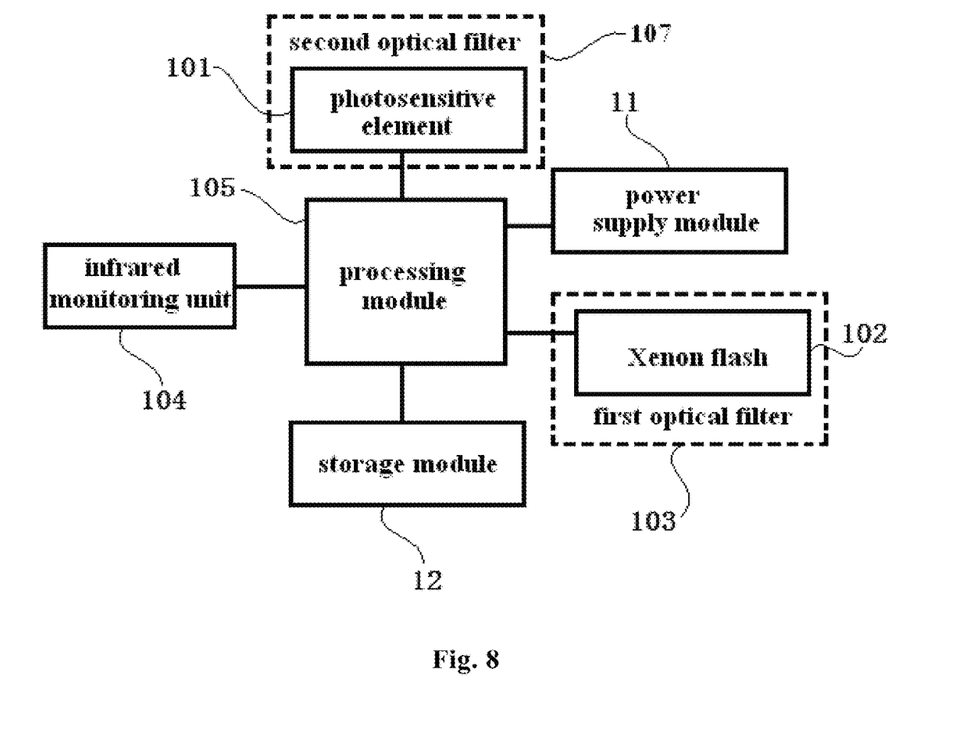
FIG. 8 is structure diagram of an infrared camera according to another embodiment of the present invention.
Figure 9:
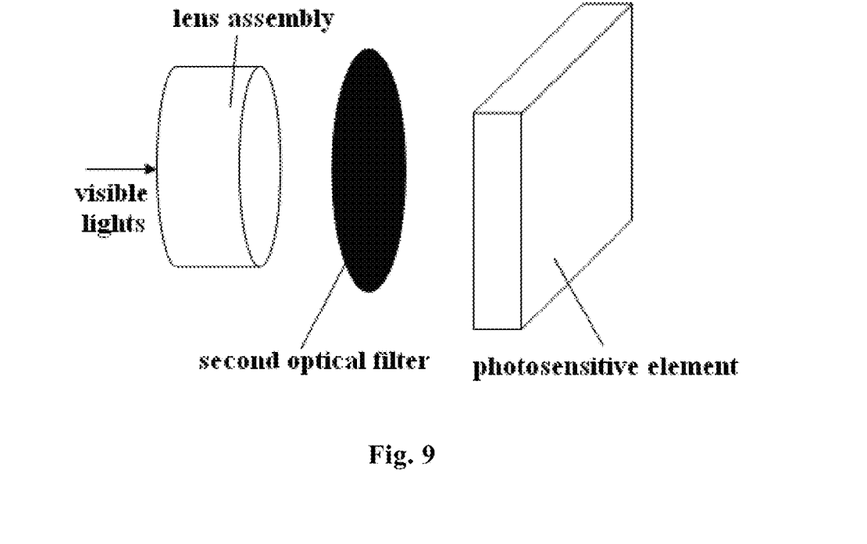
FIG. 9 is the position diagram when the second optical filter of FIG. 8 is in working state.
Figure 10:
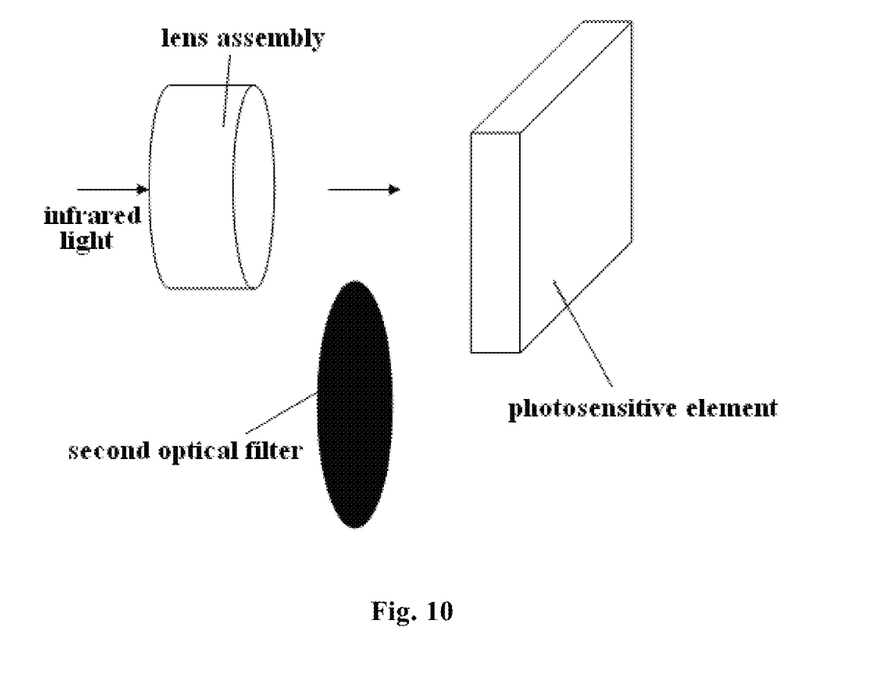
FIG. 10 is the position diagram when the second optical filter of FIG. 8 is in removal state.

Refer to FIG. 8-10, an infrared camera according to another embodiment of present invention is provided with a second optical filter 107 which is the difference comparing with embodiment 1, the second optical filter is removablely disposed in the incident light path of photosensitive element 101. In present embodiment, the second optical filter 107 in particular is disposed between the lens assembly and the photosensitive element. The second optical filter filters infrared light and allows visible lights to transmit, the first optical filter 103 and the second optical filter 107 are not in working location simultaneously.

When color photo taking is needed, for example, there are high intensity external lights or flash light source works in white light mode(i.e. the first optical filter removed), the second optical filter is moved into the light path of the photosensitive element to filter infrared light and obtain color photos, as shown in FIG. 9. When infrared photo taking is needed, for example, there are weak external lights, the flash light source works in infrared mode(i.e. the first optical filter is mounted in the emitted light path of the flash light source), the second optical filter is removed from the light path of the photosensitive element, resulting in make the photosensitive element to sense infrared light and black and white photos can be taken, as shown in FIG. 10.

In other embodiments, the second optical filter can also be disposed before the lens assembly and photosensitive element, for example, lens cover similar means could be fixed before the lens removablely.

Present embodiment causes that the camera can get better quality images both in infrared mode and white light mode.

The principle of present invention and embodiments are described as above through specific examples, it should be understood that the above embodiment is intended to assist in understanding of present invention, not a limit to present invention. For the ordinary skilled in the art, according to the spirits of present invention, modifications could be made to the above embodiments.

The invention claimed is:

1. An infrared camera, comprising:
a photosensitive element, the spectrum sensing range of the photosensitive element at least includes infrared spectrum;
a flash light source, the flash light source uses gas discharge flash;
a first optical filter, removably disposed in the emitted light path of the flash light source, the first optical filter being configured to filter out visible lights and allow infrared light to transmit;
a second optical filter, removably disposed in the incident light path of the photosensitive element, the second optical filter being configured to filter out infrared light and allow visible lights to transmit;
a processing module, used to execute instructions, the instructions execution includes: executing working flow, the working flow includes photographing flow, the photographing flow includes controlling the flash light source to flash and acquiring photo data collected by the photosensitive element;
wherein the instructions execution further includes: executing flash working mode setting flow, the flash working mode setting flow includes acquiring input flash setting signal and setting the flash working mode to whether infrared mode or not infrared mode based on the flash setting signal;
wherein the first optical filter is disposed in the emitted light path of the flash light source and no optical filter is disposed in the incident light path of the photosensitive element if the flash working mode is set to infrared mode, and the first optical filter is removed from the emitted light path of the flash light source and the second optical filter is disposed in the incident light path of the photosensitive element if the flash working mode is set to not infrared mode;
the photographing flow further includes processing the photo data, when the flash working mode is set to infrared mode, using a predefined black and white processing mode to process the photo data, when the flash working mode is set to not infrared mode, using a predefined color processing mode to process the photo data.

2. The infrared camera of claim 1, wherein the flash light source is selected from any one of Xenon flash, Neon flash, Helium flash, Nitrogen flash and argon flash.

3. The infrared camera of claim 1, further comprising infrared monitoring unit (104), used to detect infrared radiation in monitoring area and produce monitoring trigger signal when triggered by infrared radiation;
the instruction execution further includes: executing monitoring flow, the monitoring flow includes acquiring the monitoring trigger signal and start the working flow based on the monitoring trigger signal.

4. The infrared camera of claim 1, wherein the gas discharge flash uses spectral shift method to make the radiation range to shift to infrared area, the spectral shift method uses one or more of the following: adjusting the voltages at the two ends of the flash, changing the material ratio of the tube, adding magnesium arsenate powder or manganese powder to the material.

5. The infrared camera of claim 1, further comprising lighting light source;
the working flow further includes video flow, the video flow includes controlling the lighting light source to open and acquiring the video data collected by the photosensitive element;
the instruction execution further includes: executing the camera working mode setting flow, the camera working mode setting flow includes acquiring input camera setting signal and setting the camera working mode to photographing mode or video mode based on the camera setting signal, once the working flow needs to be started, if photographing mode, starting the photographing flow, if video mode, starting the video flow.

6. The infrared camera of claim 5, wherein the lighting light source uses infrared LED or white light LED.

7. The infrared camera of claim 1, further comprising an optical filter support, the optical filter support has structures matching the front cover of the camera, capable of removably engaging with the front cover, the first optical filter is embedded in the optical filter support, the size and shape of the first optical filter is adapted to the flash light source to be covered, when the optical filter support engages with the front cover, the first optical filter covers the emitted light path of the flash light source.

8. The infrared camera of claim 1, further comprising communication module;
the instruction execution further includes: executing data transmission flow, the data transmission flow includes sending the acquired data via the communication module according to the predefined transmission mode in the execution procedure of the working flow or after the working flow is accomplished.

* * * * *